United States Patent [19]

Schinkel et al.

[11] Patent Number: 5,077,129

[45] Date of Patent: Dec. 31, 1991

[54] STRETCHED POLYPROPYLENE FILMS HAVING GOOD SURFACE SLIP

[75] Inventors: Ingo Schinkel, Walsrode; Ulrich Reiners, Neuenkirchen; Anton Krallmann, Fallingbostel, all of Fed. Rep. of Germany

[73] Assignee: Wolff Walsrode AG, Walsrode, Fed. Rep. of Germany

[21] Appl. No.: 659,810

[22] Filed: Feb. 22, 1991

[30] Foreign Application Priority Data

Mar. 1, 1990 [DE] Fed. Rep. of Germany ....... 4006402

[51] Int. Cl.$^5$ .......................... B32B 5/16; C08L 33/06
[52] U.S. Cl. .................................... 428/402; 428/516; 428/910; 525/227
[58] Field of Search ................ 525/227; 428/516, 910, 428/402

[56] References Cited

U.S. PATENT DOCUMENTS

Re. 31,780  12/1984  Cooper et al. ...................... 428/213
4,584,399   4/1986   Lehr .................................... 525/227
4,710,544   12/1987  Wolfe .................................. 525/227

Primary Examiner—Edith L. Buffalow
Attorney, Agent, or Firm—Sprung Horn Kramer & Woods

[57] ABSTRACT

The new polypropylene film contains a polymer based on polyisobutyl methacrylate and polymethyl methacrylate as antiblocking agent.

10 Claims, 1 Drawing Sheet

1 μm

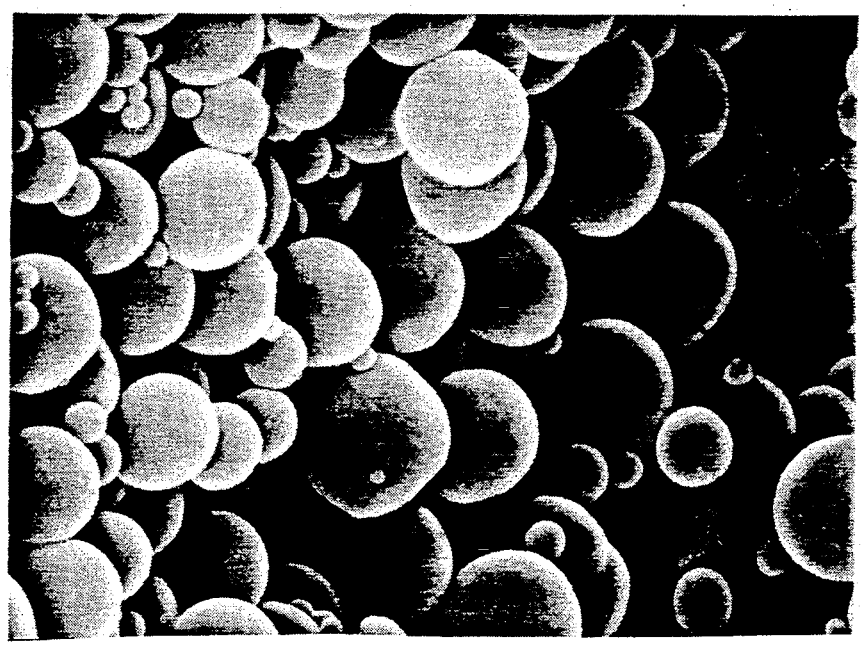
1 μm

STRETCHED POLYPROPYLENE FILMS HAVING GOOD SURFACE SLIP

This invention relates to an at least monoaxially oriented polypropylene film having improved antiblocking behavior.

Polypropylene films are very widely used as packaging materials. However, they are also used for film lamination in the graphics industry because they exhibit advantageous physical properties. Problems can arise in high-speed packaging and/or processing machines. Because of this, it is already known that antistatic agents, lubricants and, in particular, antiblocking agents can be used to improve the corresponding properties.

Silicon dioxide is the most widely used antiblocking agent, cf. EP-A-27 586 and EP-A-189 242. It is known from EP-A-242 055 that a non-melting crosslinked silicone can be used to improve antiblocking properties. According to DE-A-2 244 703, an improvement in the surface slip of polypropylene films is said to be obtained by using thermoplastic polymers, such as polyamide-6, polyamide-6,6, polyethylene terephthalate or polyethylene hydroxybenzoate. According to published Japanese patent application Sho 45-29 056, improved antiblocking properties coupled with high transparency are said to be obtained by the use of polymethyl methacrylate and/or polystyrene.

Although antiblocking behavior is improved by the use of these known antiblocking agents, the films thus treated still have disadvantages in regard to friction, transparency and gloss.

Accordingly, the problem addressed by the present invention was to provide an improved film.

The present invention relates to an at least monoaxially stretched polypropylene film containing at least one lubricant, at least one antistatic agent and at least one antiblocking agent, characterized in that the antiblocking agent contains polymerized isobutyl methacrylate and methyl methacrylate.

In one preferred embodiment, the film is a transparent film. The advantages of the antiblocking agent to be used in accordance with the invention in regard to gloss are particularly noticeable in the case of transparent films. The antiblocking agent according to the invention is preferably a copolymer or mixtures of polymerized isobutyl methacrylate and methyl ethyl methacrylate. The antiblocking agent is preferably crosslinked. In the antiblocking agent to be used in accordance with the invention, the molar ratio of polyisobutyl methacrylate to polymethyl methacrylate is generally between 1.2:1 and 7.0:1, preferably between 1.2:1 and 4.5:1 and more preferably between 1.9:1 and 3.1:1.

Polymers such as these can be obtained in known manner by polymerization of the starting components.

In one preferred embodiment, the antiblocking agent to be used in accordance with the invention consists of predominantly spherical or ellipsoidal particles, preferably with an average particle size of 0.5 to 7 $\mu$m and, more preferably, 0.7 to 4 $\mu$m. FIG. 1 is a micrograph of such an antiblocking agent.

In one particularly preferred embodiment, the spherical form of the antiblocking agent according to the invention may be approximately defined as follows by a form factor:

$$\text{Form factor } f = \sqrt{\frac{A}{d_{max}^2 \cdot \pi/4}}$$

where

A is the cross-sectional area of an individual particle which intersects the center of gravity and is orthogonal to the outer surface, $d_{max}$ is the maximum extent of the surface A.

The particles are perfectly round in shape when the form factor $f=1$. In one preferred embodiment, the form factor of an individual particle of the antiblocking agent according to the invention is preferably of the order of $0.9 \leq f \leq 1$.

The antiblocking agent to be used in accordance with the invention is preferably present in the polypropylene film in a quantity of 700 to 5,000 ppm and, more preferably, in a quantity of 1,500 to 2,400 ppm.

The films according to the invention may have one or more layers. In multilayer films, the outer layers always contain the additive according to the invention.

Preferred outer layers are sealing layers or lamination layers. Preferred compositions for the outer layers are polypropylene homopolymers or copolymers of propylene with ethylene or of propylene with butene or ethylene and butene, the polypropylene component generally being at least 70% by weight. An isotatic polypropylene having a density of 0.9 to 0.91 g/cm$^3$ and a melt flow index of 1 to 4 g/10 mins. at 230° C./21.5 N (according to DIN 53 735) is preferably used for the polypropylene of the core and outer layers.

The base layer may contain, for example, from 3 to 15% by weight and preferably from 8 to 12% by weight additives incompatible with the polypropylene, preferably inorganic additives, such as calcium carbonate, silicon dioxide, sodium aluminum silicate and/or titanium dioxide, so that the film can be opacified. However, an organic incompatible additive may also be present in finely divided form in the base layer, preferably in the form of particles of polystyrene, polymethyl methacrylate, polytetrafluoroethylene, polycarbonate and/or copolymers of these compounds. Incompatibility in the present context means that polymeric additives of the type in question have a different melting point and/or a different stretching ratio than the polypropylene, so that, under suitable conditions, the polymer matrix is opened up during the biaxial orientation of the multilayer film and vacuoles are formed, as is also the case where inorganic additives are used. The film can thus be opacified.

In one preferred embodiment, the films have a heat-sealing layer known per se, particularly of copolymers of propylene.

In addition, the multilayer films may have a gas barrier layer, preferably an oxygen barrier layer, of a hydrolyzed ethylene/vinyl acetate copolymer containing 40 to 85 mol-% vinyl acetate units, of which at least 90% by weight and preferably more than 96% by weight are saponified, and optionally typical coupling layers. The production of such ethylene/vinyl alcohol copolymers is known. Accordingly, the present invention also relates to heat-sealable multilayer films having minimal permeability to gases and excellent aroma protection.

The multilayer films treated in accordance with the invention may have a heat-lamination layer of low-sealing polymers on one side. By application of heat and pressure, a film such as this may first be heat-laminated onto other substrates and subsequently bonded under pressure with the side pretreated in accordance with the invention and then printed.

The layers of the films may be provided with other standard additives and auxiliaries, such as for example lubricants, antiblocking agents and antistatic agents in the usual quantities.

Preferred antistatic agents are alkali metal alkane sulfonates, polyether-modified, i.e. ethoxylated and/or propoxylated, polydiorganosiloxanes (polydialkyl siloxanes, polyalkyl phenyl siloxanes and the like) and/or substantially linear and saturated, aliphatic tertiary amines containing a $C_{10-20}$ aliphatic radical and substituted by two $C_{1-4}$ hydroxyalkyl groups, among which N,N-bis-(2-hydroxyethyl)-alkyl amines containing $C_{10-20}$ and preferably $C_{12-18}$ alkyl groups are particularly suitable. The effective quantity of antistatic agent is in the range from 0.05 to 3% by weight, based on the layer. Where polyether-modified polysiloxane is used, it is only added to the polymer for the base layer and/or to the polymer of that of the two sealing layers which is intended as the polydialkylsiloxane-incorporated layer.

Suitable other antiblocking agents are inorganic additives, such as silicon dioxide, calcium carbonate, magnesium silicate, aluminum silicate, calcium phosphate and the like, nonionic surfactants, anionic surfactants and/or incompatible organic polymers, such as polyamides, polyesters, polycarbonates and the like.

Examples of lubricants are higher aliphatic acid amides, higher aliphatic acid esters, waxes and metal soaps. The effective quantity of lubricant is in the range from 0.1 to 2% by weight, based on the layer.

Suitable stabilizers are the usual stabilizing compounds for ethylene, propylene and other α-olefin polymers. The effective quantity is generally from 0.1 to 2% by weight, based on the layer.

Preferred combinations of additives are described, for example, in EP-A-27 586 and in EP-A-263 882.

The films may be processed by standard methods, such as lamination, coating or melt (co)extrusion. The films are at least monoaxially and preferably biaxially stretched. Longitudinal stretching is preferably carried out in a ratio of 5:1 to 7:1 while transverse stretching is preferably carried out in a ratio of 7:1 to 10:1.

The polypropylene film preferably has a thickness of 10 to 50 μm.

The film according to the invention may be subjected to a pretreatment in the usual way on one or both sides, more particularly to a corona, fluorine or plasma pretreatment. In one preferred embodiment, the film comprises a heat lamination layer on at least one side, more particularly a heat lamination layer of an ethylene/vinyl acetate copolymer and another copolymer selected from the group consisting of ethylene methyl acrylate and ethylene/acrylic acid copolymers. In the present context, a heat-laminatable layer is understood to be the layer which, by virtue of its relatively large thickness, is suitable for joining the film to other substrates, such as paper or paperboard and for processing to composites, such as prospectus and book covers, record sleeves and paperboard packs.

By virtue of their excellent surface slip properties, the films according to the invention are particularly suitable for processing on high-speed packaging machines. They may also be processed at high speeds on drum and tunnel laminating machines.

By virtue of their excellent optical properties, the films produced in accordance with the invention are suitable for film lamination, more particularly gloss film lamination, graphic products, such as book covers, prospectus covers, book sleeves, record sleeves, packs, etc.

Where the film according to the invention is a multilayer film, the antiblocking agent to be used in accordance with the invention is preferably only used in outer layers.

EXAMPLES

Test methods

The surface slip of the films is evaluated in accordance with DIN 53 375 (determination of friction behavior).

The measurement of friction in accordance with this standard is used to determine the behavior of films when two films are rubbed against one another and when a film is rubber against metal. The result is expressed as the coefficient of friction μ.

The optical properties are evaluated by observation of the vacuoles formed around the antiblocking agents during the stretching process under a light microscope with magnifications of 50:1 to 150:1.

The optical properties are evaluated by measurement of haze in accordance with ASTM D 1003. In contrast to the test specification, the film sample is positioned in such a way that scattering angles of less 8° can be measured so that even relatively large impurities can be determined.

EXAMPLE

A film consisting of polypropylene having a density of 0.91 g/cm³ and a melt index of 3.3 g/10 mins. (230° C./21.6 N) is produced. The film is stretched first longitudinally in a ratio of 4.7 to 5:1 and then in a ratio of 9.2 to 9.8:1. The thickness of the film is 15 μm. The film is corona-treated on both sides.

In addition to polypropylene, the film contains the following additives:

0.1% by weight of an additive consisting of polyisobutyl methacrylate and polymethyl methacrylate in a molar ratio of 2.5:1.

0.15 % by weight of an ethoxylated amine as antistatic agent 0.3 % by weight of an erucic acid amide as lubricant.

COMPARISON EXAMPLE 1

A comparison film is prepared in the same way as described in the Example.

In addition to polypropylene, the comparison film contains the following constituents:

0.1% by weight of a powder-form silicon dioxide 0.15% by weight of an ethoxylated amine 0.3% by weight of an erucic acid amide.

COMPARISON EXAMPLE 1

Another comparison film is produced in the same way as described in the Example.

In addition to polypropylene, this film contains the following constituents:

0.1% by weight of a powder-form polymethyl methacrylate 0.15% by weight of an ethoxylated amine 0.3% by weight of an erucic acid amide.

|  | Comparison | |
|---|---|---|
|  | Surface slip coefficient of friction acc. to DIN 53 375 film/film | Optical properties, haze acc. to ASTM D100 % |
| Example | 0.20 | 0.6 |
| Comparison Example 1 | 0.51 | 2.5 |
| Comparison Example 2 | 0.60 | 1.3 |

We claim:

1. An at least monoaxially stretched polypropylene film containing at least one lubricant, at least one antistatic agent and at least one antiblocking agent, wherein the antiblocking agent contains polymerized polyisobutyl methacrylate and polymethyl methacrylate.

2. A film as claimed in claim 1, which is transparent.

3. A film as claimed in claim 1, wherein the molar ratio of polyisobutyl methacrylate to polymethyl methacrylate is 1.2:1 to 7.0:1.

4. A film as claimed in claim 1, wherein the antiblocking agent is present in a quantity of 700 to 5,000 ppm.

5. A film as claimed in claim 1, wherein the antiblocking agent consists of substantially spherical particles.

6. A film as claimed in claim 1, which is a multilayer film in which the antiblocking agent is only present in one or both outer layers.

7. A film as claimed in claim 1, which is a heat-lamination or sealing layer.

8. A film as claimed in claim 1, wherein the antiblocking agent is a copolymer of polymerized isobutyl methacrylate and methyl methacrylate.

9. A film as claimed in claim 1, wherein the antiblocking agent is crosslinked.

10. A film as claimed in claim 1, which has been subjected to a corona, fluorine or plasma treatment.

* * * * *